(12) United States Patent
Kawamura

(10) Patent No.: US 10,048,458 B2
(45) Date of Patent: Aug. 14, 2018

(54) OPTICAL MODULE

(71) Applicant: Sumitomo Electric Industries, Ltd., Osaka-shi (JP)

(72) Inventor: Masanobu Kawamura, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/852,457

(22) Filed: Dec. 22, 2017

(65) Prior Publication Data

US 2018/0180830 A1   Jun. 28, 2018

(30) Foreign Application Priority Data

Dec. 28, 2016 (JP) .................................. 2016-256126

(51) Int. Cl.
*G02B 6/42* (2006.01)

(52) U.S. Cl.
CPC ........... *G02B 6/4292* (2013.01); *G02B 6/425* (2013.01); *G02B 6/4206* (2013.01); *G02B 6/4214* (2013.01); *G02B 6/4246* (2013.01); *G02B 6/4286* (2013.01)

(58) Field of Classification Search
CPC .................................................... G02B 6/4286
See application file for complete search history.

(56) References Cited

U.S. PATENT DOCUMENTS

| | | | |
|---|---|---|---|
| 8,787,714 B2 | 7/2014 | Morioka | |
| 9,341,796 B2 * | 5/2016 | Kuo | ...................... G02B 6/4257 |
| 9,470,857 B2 * | 10/2016 | Shah | ...................... G02B 6/4246 |

FOREIGN PATENT DOCUMENTS

JP   2011-133807 A   7/2011

* cited by examiner

*Primary Examiner* — Omar R Rojas
(74) *Attorney, Agent, or Firm* — Venable LLP; Michael A. Sartori; Miguel A. Lopez

(57) ABSTRACT

An optical module includes a substrate, a light emitting element, a light receiving element, and a block by which some of light emitted from the light emitting element is guided to the light receiving element. The block includes a collimating lens, an optical splitter, condensing lenses, a mirror, and a refraction part. The refraction part includes a surface at which a light beam transmitted by the optical splitter is guided to the condensing lens and a surface at which a light beam transmitted by the optical splitter is deflected from the condensing lens.

10 Claims, 10 Drawing Sheets

OPTICAL MODULE

TECHNICAL FIELD

An aspect of the present invention relates to an optical module.

BACKGROUND

Patent Literature 1 describes an optical module including a lens array, a photoelectric conversion device, and an optical fiber. The photoelectric conversion device includes a semiconductor substrate, a plurality of light emitting elements mounted on the semiconductor substrate, and the same number of light receiving elements as the light emitting elements disposed on the semiconductor substrate. The lens array includes a first lens surface, a total reflection surface, a reflection and transmission layer, a second lens surface, and a third lens surface. The first lens surface receives light from the light emitting element. The total reflection surface totally reflects light from the first lens surface. The reflection and transmission layer reflects and transmits light from the total reflection surface. The second lens surface condenses light transmitted by the reflection and transmission layer on the optical fiber. The third lens surface condenses light reflected by the reflection and transmission layer on the light receiving element. The optical fibers, the first lens surfaces, the second lens surfaces, and the third lens surfaces are disposed in the same number as the light emitting elements and the light receiving elements. In compactation of the optical module, a large alignment error between the light emitting element of the photoelectric conversion device and the first lens surface of the lens array and/or a large alignment error between the light receiving element and the third lens surface of the lens array causes light deviated from an original optical path, called stray light, from light output from a certain light emitting element. The stray light enters a light receiving element adjacent to a light receiving element corresponding to the light emitting element, and deteriorates performance of the optical module. It is desirable to reduce an influence of such stray light on the light receiving element.

[Patent Literature 1] Japanese Unexamined Patent Publication No. 2011-133807

SUMMARY

An optical module according to an aspect of the present invention includes a substrate having a first side, a light emitting element mounted on the first side of the substrate and configured to emit a radiated light, a light receiving element mounted on the first side of the substrate, and a block mounted on the first side of the substrate that the radiated light to the light receiving element. The block includes a collimating lens configured to convert the radiated light into collimated light, an optical splitter configured to split the collimated light into a reflected light and a transmitted light, a first condensing lens configured to condense the reflected light on an optical waveguide member, a second condensing lens facing the light receiving element, a mirror configured to reflect the transmitted light, and a refraction part that refracts the transmitted light reflected by the mirror. The refraction part has a first refracting surface and a second refracting surface. The first refracting surface is configured to refract the transmitted light reflected by the mirror for guiding the transmitted light reflected by the mirror to the second condensing lens. The second refracting surface is configured to deflect the transmitted light reflected by the mirror from the second condensing lens. The second condensing lens is configured to condense a portion of the transmitted light refracted by the refraction part on the light receiving element.

DETAILED DESCRIPTION

Figure 1:
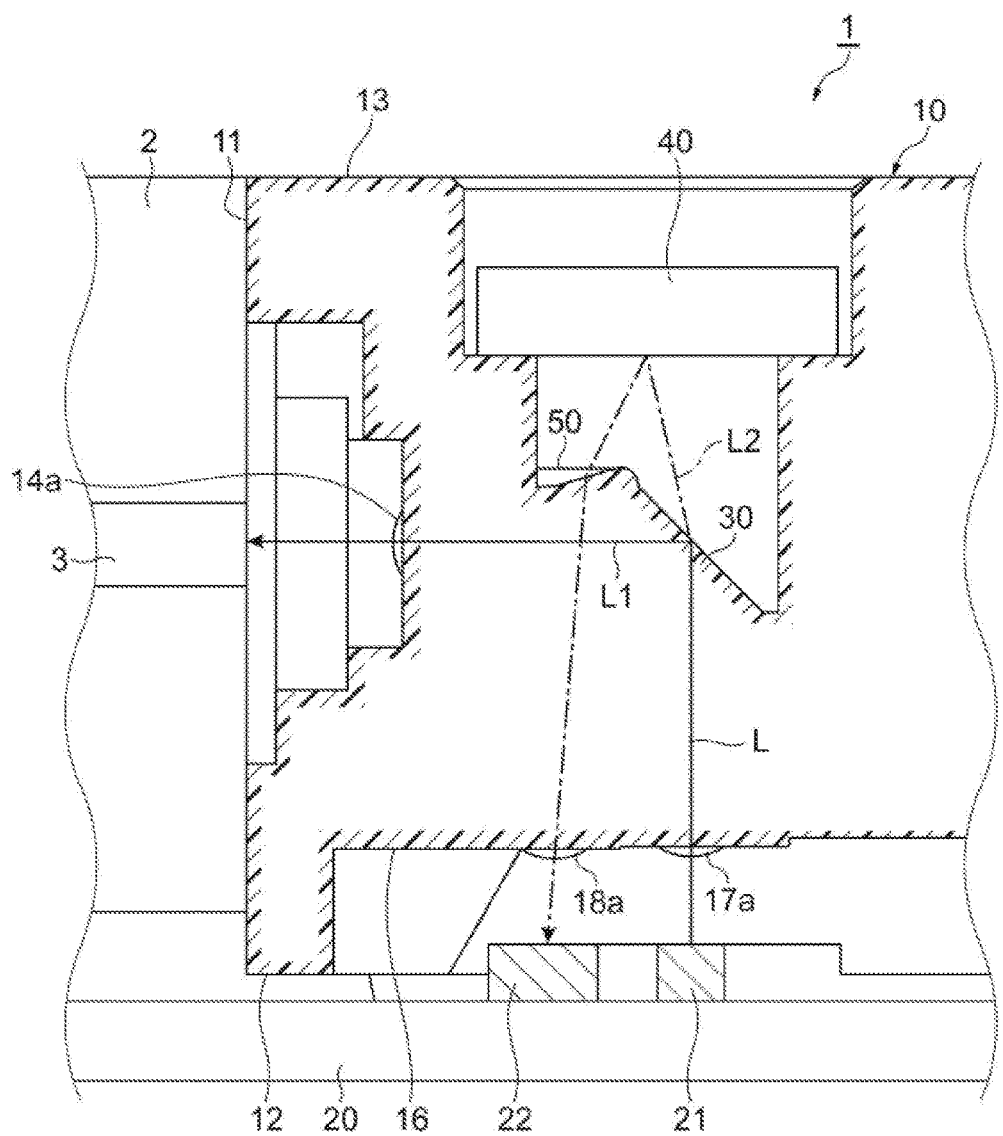
FIG. 1 is a sectional view showing an optical module according to an embodiment.

Specific examples of an optical module according to an embodiment will be described below with reference to the drawings. Here, the present invention is not limited to such examples, and is defined by the scope of the appended claims and is intended to encompass all modifications within the scope equivalent to the scope of the appended claims. In the following description, in description of drawings, the same or corresponding elements will be denoted by the same reference numerals and duplicate descriptions thereof will be omitted.

FIG. 1 is a sectional view showing an optical module 1. The optical module 1 is a module capable of transmitting a plurality of optical signals. The optical module 1 is mounted, for example, inside an optical transceiver. The optical module 1 is optically connected to an optical receptacle of the optical transceiver through an optical fiber 3 (optical waveguide member) built into an MT connector 2. The optical fiber 3 is, for example, a multimode fiber, and may be a single mode fiber or another optical waveguide member.

The optical module 1 includes a resin block 10 and a substrate 20. The substrate 20 is, for example, a printed circuit board. However, the substrate 20 is not limited to a printed circuit board, and may be a semiconductor substrate. An optical device and an electronic device are mounted on a surface (component side) of the substrate 20. The block 10 is mounted on the component side of the substrate 20 and covers the optical device and the electronic device mounted on the substrate 20. Other devices and electrical parts may be mounted on the component side for constituting an electric circuit. The block 10 may also cover such other devices and electrical parts.

Some examples of the optical device mounted on the component side of the substrate 20 are a light emitting element 21 and a light receiving element 22. The light emitting element 21 emits a radiated light. The light emitting element 21 is, for example, a vertical-cavity surface-emitting laser (VCSEL) which is a type of semiconductor laser diode. The light receiving element 22 is a photodiode for monitoring. As described laser, the light receiving element 22 receives a part of light emitted from the light emitting element 21 for a feedback control. In addition, on the component side of the substrate 20, a circuit (drive circuit) configured to drive the light emitting element 21 and a circuit (amplification circuit) configured to amplify electrical signals (photoelectric current) output from various photodiodes including the light receiving element 22 are provided for constituting a feedback control circuit. Here, a circuit other than these circuits may be additionally provided on the component side of the substrate 20.

Figure 2:
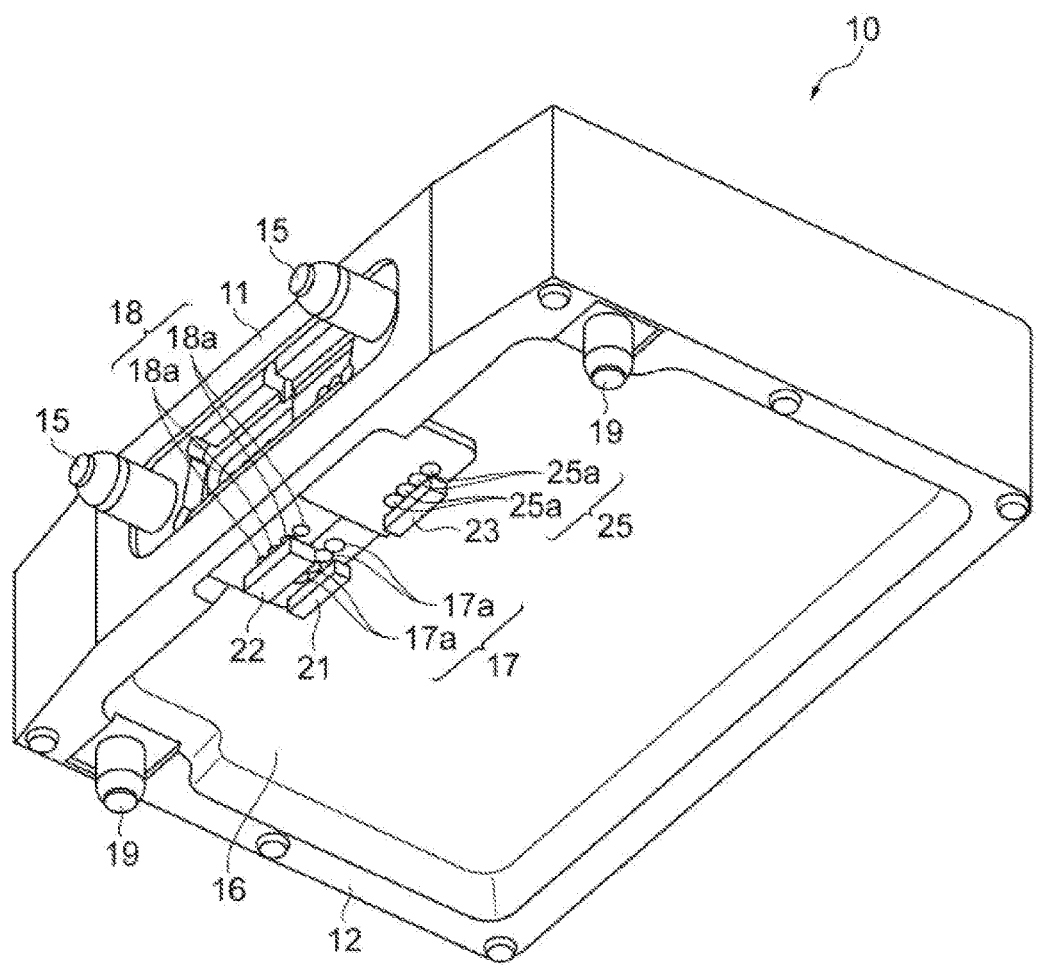
FIG. 2 is a perspective view showing a block of the optical module in FIG. 1.

FIG. 2 is a perspective view showing the block 10, the light emitting element 21, and the light receiving elements 22 and 23. The light receiving element 23 is, for example, a photodiode configured to receive an optical signal provided through the optical fiber 3 built into the MT connector 2. In addition, the block 10 is made of a transparent resin through which light emitted from the light emitting element 21 is transmitted and is made of, for example, ULTEM (registered trademark). A refractive index of the block 10 is, for example, 1.64. Here, the light emitting element 21, and the light receiving elements 22 and 23 are mounted on the component side of the substrate 20. The light receiving elements 22 is positioned between the first condensing lens 14a and the light emitting element 21, on the component side of the substrate. However, the substrate 20 is not shown in order to show positions of these elements in FIG. 2.

Figure 3:
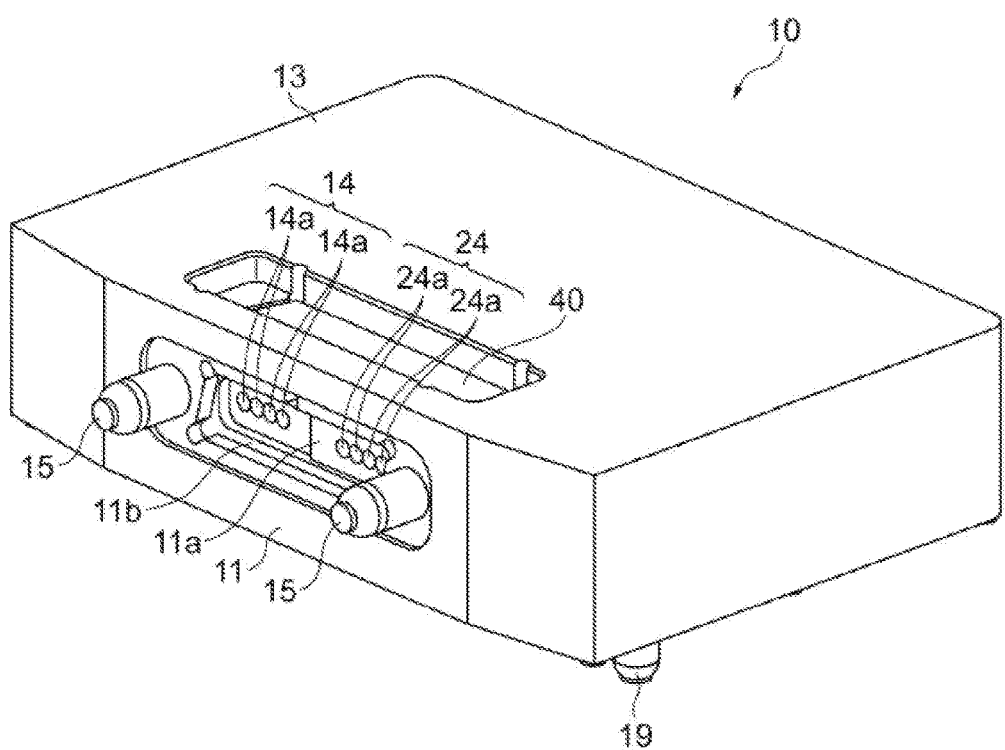
FIG. 3 is a perspective view of the block in FIG. 2 seen in a direction different from that of FIG. 2.

FIG. 3 is a perspective view showing the block 10. As shown in FIG. 2 and FIG. 3, the block 10 includes a front surface 11, a bottom surface 12, and a top surface 13. An optical port 11a is exposed at the center of the front surface 11. At the optical port 11a, a lens array 14 corresponding to the light emitting element 21 and a lens array 24 corresponding to the light receiving element 23 are exposed. The lens array 14 is optically coupled to the light emitting element 21. The lens array 24 is optically coupled to the light receiving element 23. The front surface 11 can be optically connected to the optical fiber 3 through the optical port 11a.

The lens array 14 includes a plurality of condensing lenses 14a (first condensing lenses). The condensing lenses 14a are integrally formed with the block 10. The lens array 24 includes a plurality of collimating lenses 24a and the collimating lenses 24a are integrally formed with the block 10. The number of the condensing lenses 14a is set to be equal to the number of the light emitting elements 21, or may be larger than the number of light emitting elements 21. The number of the collimating lenses 24a is set to be equal to the number of the light receiving elements 23, or may be larger than the number of the light receiving elements 23. Also, here, a lens for receiving collimated light and condensing the collimated light on a light receiving element or an end surface of an optical fiber is referred to as a condensing lens and a lens for converting light emitted from a light emitting element into collimated light is referred to as a collimating lens. The condensing and collimating lenses may have different shapes, focal lengths, and the like according to different applications thereof, but all of them are optical lenses.

The optical fiber 3 in the MT connector 2 described above is optically connected to the optical port 11a. According to the optical connection, for example, light condensed by the condensing lenses 14a is efficiently incident on the optical fiber 3, and a state (optical coupling) in which the condensing lenses 14a and the optical fiber 3 are optically connected is obtained. In addition, in order to secure a desired position of the MT connector 2 with respect to the optical port 11a, a pair of guide pins 15 are provided on both sides (outer sides) in a direction in which lenses of the lens arrays 14 and 24 are aligned. A step 11b is provided on an outer circumference of the optical port 11a, and the outer edge of the step 11b has a rectangular shape with circular corners. The desired position of the guide pins 15 is set so that efficiency of the above-described optical connection is improved according to the shape of the MT connector.

The bottom surface 12 of the block 10 includes a concave housing unit 16. The housing unit 16 is set to provide a housing space and cover optical devices such as the light emitting element 21 and the light receiving elements 22 and 23 mounted on a mounting surface (component side) of the substrate 20. The housing unit 16 may also cover other devices and electrical parts mounted on the component side. More specifically, in an area on the component side of the substrate 20 that is covered by the housing unit 16, in addition to optical devices such as the light emitting element 21 and the light receiving elements 22 and 23, a drive circuit (driver) configured to drive the light emitting element 21, an amplifier (transimpedance amplifier) configured to amplify an electrical signal output from the light receiving element 23, and the like are housed. Since the housing unit 16 has a shape concave to the inside of the block 10, even if the bottom surface 12 of the block 10 is disposed in contact with the mounting surface (component side) of the substrate 20, the housing space in a normal direction of the top surface and the mounting surface of such devices prevents such devices from coming in contact with the block 10 while such optical devices (such as the light emitting element 21 and the light receiving elements 22 and 23) and electronic devices (the above-described drive circuit and amplification circuit) are mounted on the substrate 20.

In an area on the mounting surface of the substrate 20 covered by the housing unit 16, a control circuit configured to control optical power of the light output from the light emitting element 21 may be additionally configured. The control circuit is, for example, an automatic power control (APC) circuit. The APC circuit receives a monitor signal output from the light receiving element 22 and controls a drive current supplied to the light emitting element 21. The APC circuit controls a drive current according to the monitor signal corresponding to an intensity (optical power) of light (monitoring light) that is received by the light receiving element 22, and controls an intensity (optical power) of the light emitted from the light emitting element 21 by varying the drive current. For example, when amplitude of the monitor signal is smaller than a predetermined value, the APC circuit increases the drive current, and an intensity of the light emitted from the light emitting element increases. On the other hand, when amplitude of the monitor signal is larger than the predetermined value, the APC circuit decreases the drive current, and an intensity of the light emitted from the light emitting element is reduced. Such a feedback control allows the optical module to maintain an intensity of the light emitted from the light emitting element at a desired value.

The light emitting element 21 and the light receiving elements 22 and 23 are disposed on the mounting surface (component side) of the substrate 20 in a lateral direction which is a direction in which a plurality of lenses are aligned. That is, the light emitting element 21 and the light receiving elements 22 and 23 extend in a lateral direction (a direction parallel to the component side) perpendicular to the optical axis of the optical fiber 3 in the MT connector 2 connected to the block 10. For example, in correspondence with three axes, the X axis, the Y axis, and the Z axis, which are orthogonal to each other, when the optical axis of the optical fiber 3 is defined as a Z axis direction and a normal line of the substrate 20 is defined as a Y axis direction, the light emitting element 21 and the light receiving elements 22 and 23 are disposed in an X axis direction. Three lens arrays 17, 18, and 25 are provided on the bottom surface 12 of the block 10. The lens arrays 17, 18, and 25 extend in a lateral direction along the light emitting element 21 and the light receiving elements 22 and 23. That is, in a direction in which the light emitting element 21 and the light receiving elements 22 and 23 mounted on the mounting surface of the substrate 20 are aligned, individual lenses constituting the lens array and respective elements are disposed in one-to-one correspondence (facing) with each other.

The lens array 18 on a side close to the front surface 11 faces the light receiving element 22 in a vertical direction (a normal direction of the mounting surface). The lens arrays 17 and 25 on a side distant from the front surface 11 face the light emitting element 21 and the light receiving element 23 in a vertical direction (a normal direction of the mounting surface). The lens arrays 17, 18, and 25 are integrally formed with the block 10 similarly to the lens arrays 14 and 24 formed in the optical port 11a.

Two guide pins 19 are provided on the bottom surface 12 of the block 10. The guide pins 19 are provided to accurately position the block 10 with respect to the substrate 20. Each of the guide pins 19 is fit into a hole formed in the surface (the mounting surface) of the substrate 20, and thus brings the accurate positioning of the block 10. In this case, a position of the guide pins 19 in the block 10 and a position of the hole formed in the mounting surface (component side) of the substrate 20 are set so that lenses constituting each lens array formed in the block 10 and the optical devices (the light emitting element 21 and the light receiving elements 22 and 23) face each other as described above. In addition, on the top surface 13 of the block 10, a mirror 40 that reflects light from the light emitting element 21 inside the block 10 is exposed. The mirror 40 will be described below in detail.

The light emitting element 21 and the light receiving elements 22 and 23 are disposed to correspond to the lens arrays 17, 18, and 25, respectively. The lens array 17 includes four collimating lenses 17a. The lens array 18 includes four condensing lenses 18a (second condensing lens). The lens array 25 includes four condensing lenses 25a. The collimating lenses 17a face the light emitting element 21. The condensing lenses 18a face the light receiving element 22. The condensing lenses 25a face the light receiving element 23. Here, when it is described that they face each other, for example, it means that the light emitting element 21 and the collimating lens 17a are disposed on substantially the same optical axis so that light emitted from the light emitting element 21 is incident on the collimating lens 17a and is converted into predetermined collimated light. In addition, it means that the condensing lens 18a and the light receiving element 22 are disposed on substantially the same optical axis so that collimated light incident on the condensing lens 18a is condensed on the center of a light reception diameter of the light receiving element 22. Similarly, the condensing lens 25a and the light receiving element 23 are disposed on substantially the same optical axis so that collimated light incident on the condensing lens 25a is condensed on the center of a light reception diameter of the light receiving element 23.

Next, an optical connection between the light emitting element 21 and the light receiving element 22, the block 10, and the optical fiber 3 built in the MT connector 2 will be described.

As shown in FIG. 1, the light emitting element 21 and the light receiving element 22 are mounted on the mounting surface (component side) of the substrate 20, and the upper part thereof (on the side of the top surface 13) is covered by the housing unit 16 of the block 10. An optical signal is output from the light emitting element 21 in the vertical direction (normal direction) of the mounting surface (component side) of the substrate 20. As described above, since the collimating lens 17a of the lens array 17 is integrally formed on the surface of the block 10, the light from the light emitting element 21 is incident on the block 10 through the collimating lens 17a. Light that is incident on the collimating lens 17a that has been emitted from the light emitting element 21 is converted into a collimated light beam L by the collimating lens 17a.

The block 10 further includes a split unit 30, the mirror 40, and a refraction part 50. The split unit 30 (optical splitter) is configured to split the collimated light beam L converted by the collimating lens 17a into two light beams L1 and L2 (reflected light and transmitted light). The mirror 40 reflects the light beam L2 that is refracted and split off by the split unit 30. The refraction part 50 refracts the light beam L2 reflected by the mirror 40. The other light beam L1 that is reflected and split off by the split unit 30 is guided to the condensing lens 14a of the lens array 14 described above, and is condensed and made incident on the end surface of the optical fiber 3 of the MT connector 2 by the condensing lenses 14a.

The light beam L2 that is transmitted though the split unit 30 and has been split off is guided to the mirror 40. The light beam L2 reflected by the mirror 40 is incident on the refraction part 50. The light beam L2 from the refraction part 50 is incident on the condensing lens 18a of the lens array 18. Light incident on the condensing lens 18a is condensed and incident on the light receiving element 22. The split unit 30 and the refraction part 50 will be described below in detail.

Figure 4:
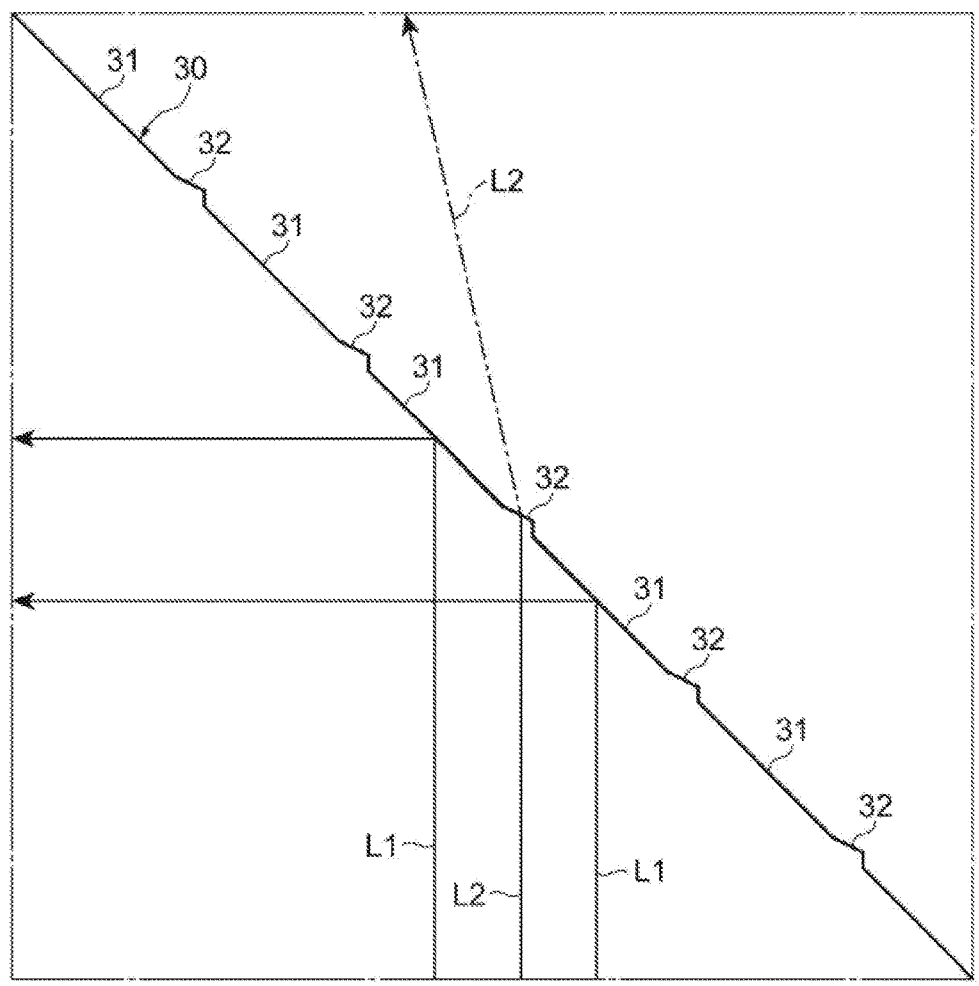
FIG. 4 is an enlarged diagram of a split unit of the optical module in FIG. 1.

FIG. 4 is an enlarged diagram of the split unit 30 of the block 10. As shown in FIG. 4, the split unit 30 includes a surface 31 (reflecting surface) forming an angle of 45° with respect to an optical path of the light beams L1 and L2 included in the collimated light beam L and a surface 32 (transmitting surface) forming an angle of greater than 45° with respect to the optical path of the light beams L1 and L2. The light beam L1 that comes from the collimating lens 17a and is incident on the surface 31 is totally reflected by the surface 31, and is condensed on the optical fiber 3 through the condensing lenses 14a. On the other hand, the light beam L2 that comes from the collimating lens 17a and is incident on the surface 32 is transmitted through the split unit 30 and is guided to the mirror 40.

Figure 5:
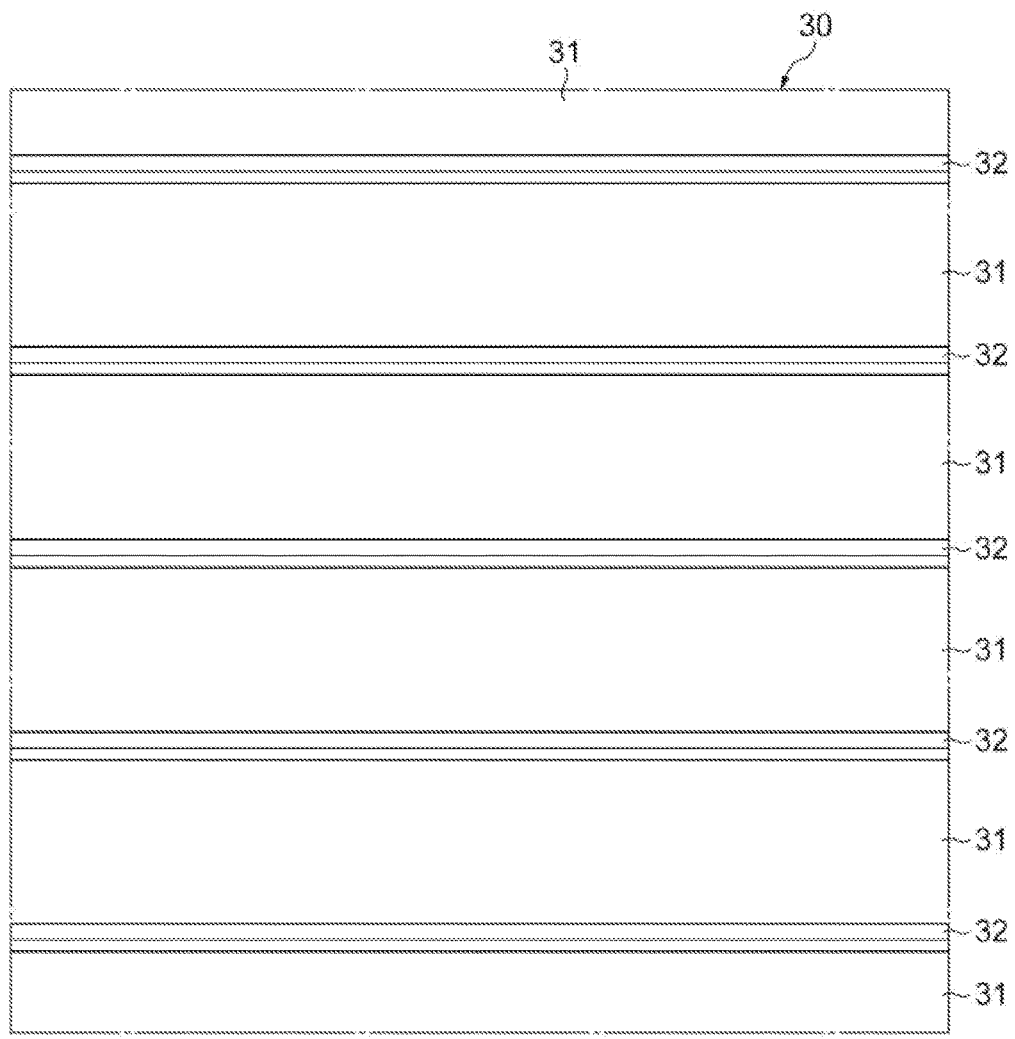
FIG. 5 is a plan view showing the split unit in FIG. 4.

FIG. 5 is a plan view showing the split unit 30. As shown in FIG. 5, in the split unit 30, the surfaces 31 and 32 described above each extend linearly. In the split unit 30, the plurality of surfaces 31 and the plurality of surfaces 32 are alternately formed. The plurality of surfaces 31 and the plurality of surfaces 32 have respective intervals. The plan view in FIG. 5 shows a state seen from the surface 31 in a normal direction. In the split unit 30, for example, when an interval between the plurality of surfaces 32 is narrowed and a large number of surfaces 32 are disposed or when the width of each surface 32 increases, it is possible to increase a proportion of the light beam L2 guided to the mirror 40 with respect to the light beam L1 reflected toward the condensing lenses 14a. In addition, when an interval between the surfaces 32 is widened and the number of surfaces 32 is reduced or when the width of each surface 32 is narrowed, it is possible to decrease a proportion of the light beam L2 guided to the mirror 40 with respect to the light beam L1 reflected toward the condensing lenses 14a. That is, in light emitted from the light emitting element 21, a ratio of an intensity of light (optical signal) for communication that is reflected by the split unit 30 and is incident on the optical fiber 3 to an intensity of light (monitoring light) for monitoring that is transmitted through the split unit 30 and is incident on the light receiving element 22 can be arbitrarily adjusted by varying widths and intervals of the surfaces 31 and the surfaces 32. For example, when the intensity of monitoring light is smaller than the intensity of transmission light incident on the optical fiber, the width of the surface 32 is set to be smaller than the width of the surface 31.

Figure 6:
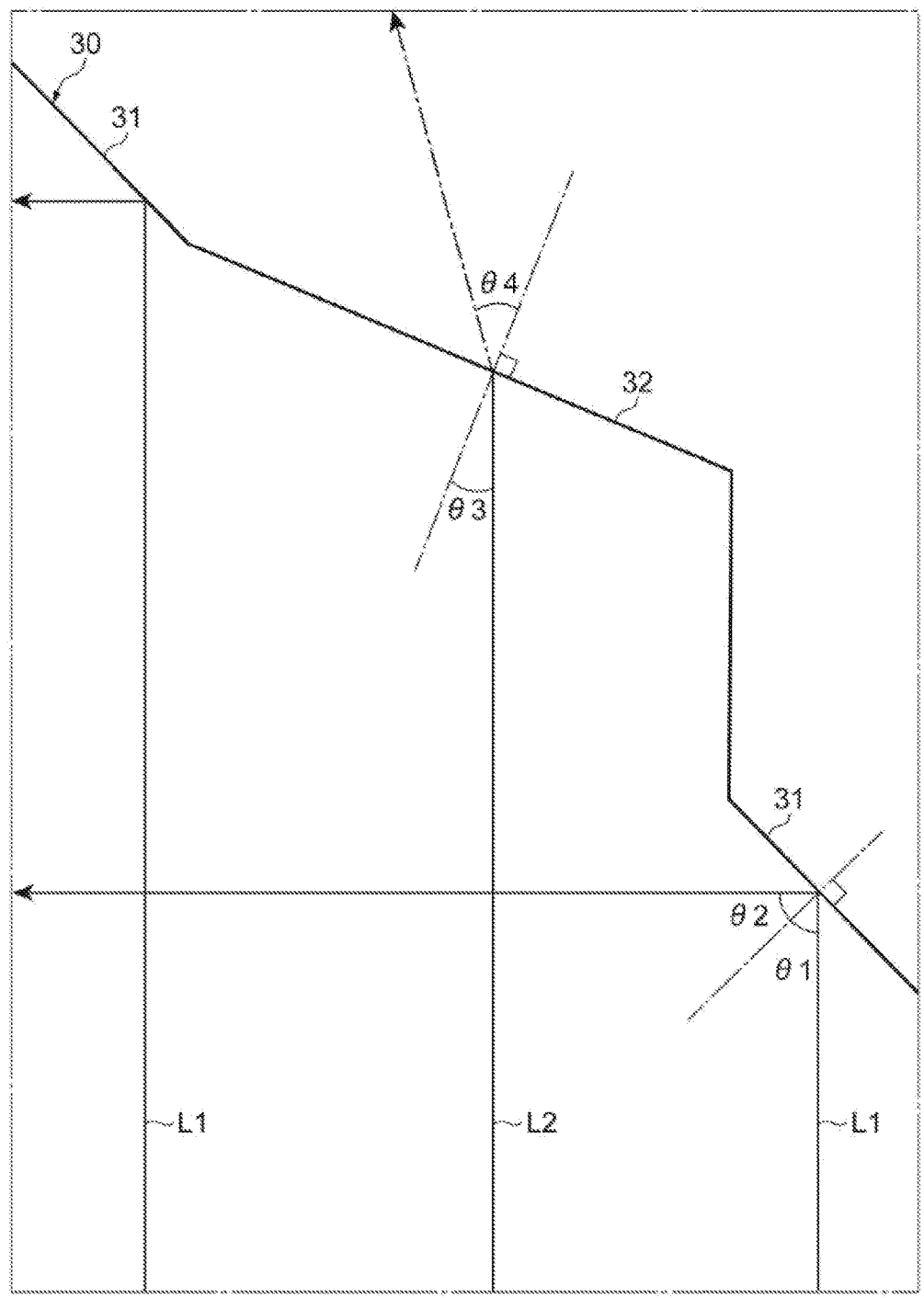
FIG. 6 is an enlarged diagram of surfaces of the split unit in FIG. 4.

FIG. 6 shows the split unit 30 that is enlarged further than in FIG. 4. Incidentally, in the present embodiment, since a refractive index of the block 10 is 1.64 and a refractive index of air is 1.00, a critical angle with respect to the split unit 30 is 37.57°. As shown in FIG. 6, the light beam L1 that comes from the collimating lens 17a and is incident on the surface 31 is incident on an interface between the split unit 30 and air at an incident angle θ1. The incident angle θ1 is, for example, 45°, and is larger than the critical angle. Therefore, the light beam L1 forms an angle θ2 and is totally reflected. The angle θ2 is, for example, 45°. On the other hand, the light beam L2 that comes from the collimating lens 17a and is incident on the surface 32 is incident on an interface between the split unit 30 and air at an incident angle θ3. The incident angle θ3 is, for example, 25° and is smaller than the critical angle. Therefore, the light beam L2 forms a refraction angle θ4 and is transmitted through the interface. Here, the incident angles θ1 and θ3, the angle θ2, and the refraction angle θ4 are based on a normal line (0°) of a surface on which each light beam is incident. For example, when light is incident on a certain surface perpendicularly, the incident angle is 0°.

Figure 7:
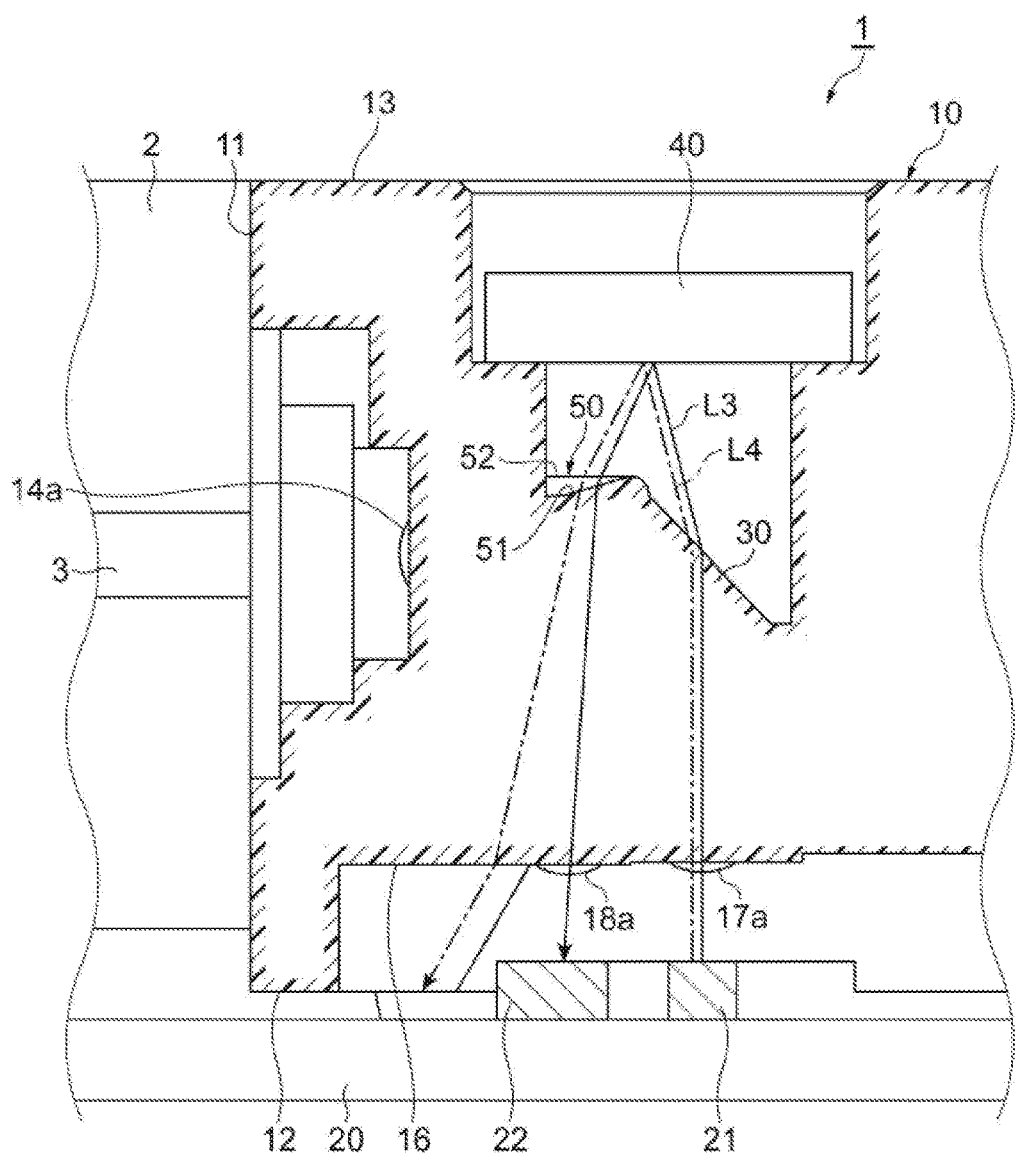
FIG. 7 is a sectional view showing the optical module in FIG. 1.
Figure 8:
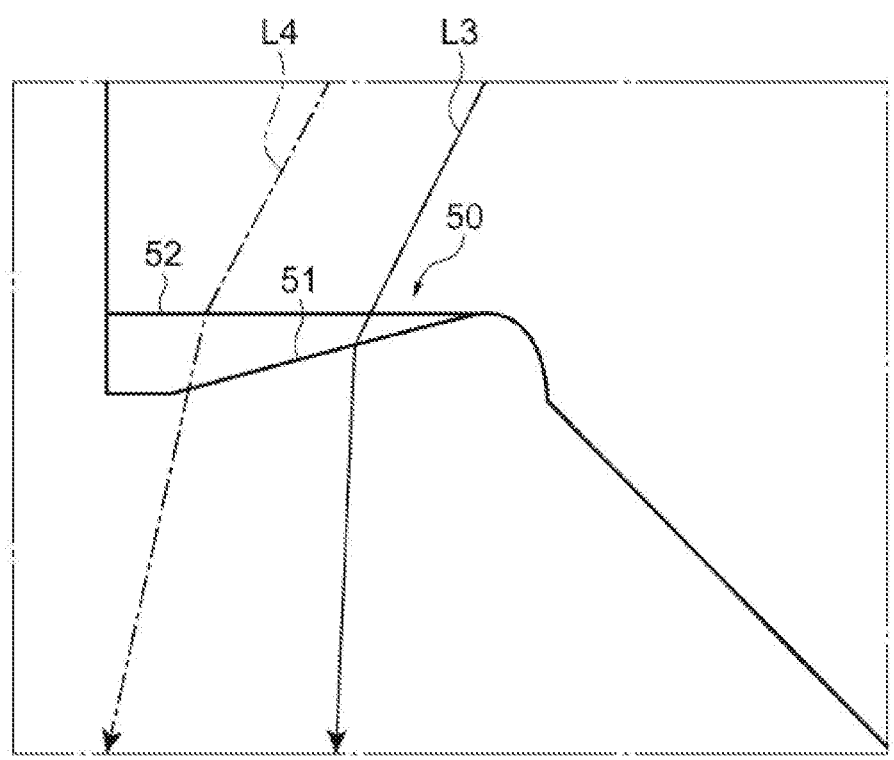
FIG. 8 is a diagram showing a refraction part of the optical module in FIG. 1.

FIG. 7 shows an optical path of light beams L3 and L4 that are transmitted through the split unit 30, are reflected by the mirror 40, and pass through the refraction part 50. FIG. 8 shows an enlarged diagram of the refraction part 50. The light beam L3 indicates a light beam that passes through an original optical path from the light emitting element 21. The light beam L4 indicates a light beam that has deviated from the original optical path from the light emitting element 21. For example, the light beam L3 is a light beam when the light emitting element 21 and the collimating lens 17a are aligned with substantially no positional error. For example, in such an no-error alignment, a center of a light emitting area in the light emitting element 21 corresponds to the center of collimating lens 17a (see the light beam L3 in FIG. 9). The light beam L4 is a light beam when the light emitting element 21 is aligned with a positional error in the direction parallel to a line in which two or more collimating lens 17a are disposed for constituting a lens array (refer to FIG. 9). As shown in FIG. 7 and FIG. 8, the light beams L3 and L4 reflected by the mirror 40 are incident on the refraction part 50. The refraction part 50 includes a surface 51 (first refracting surface) at which the light beam L3 is guided to the condensing lens 18a and a surface 52 (second refracting surface) at which the light beam L4 is guided in a direction away from the condensing lens 18a.

The surface 52 of the refraction part 50 is provided above (on the side of the mirror 40) the surface 51 of the refraction part 50. An incident position of the light beam L4 incident on the surface 52 is positioned on the side above and the side in front (on the side of the optical fiber 3) of an incident position of the light beam L3 incident on the surface 51. In addition, the surface 52 extends parallel to the optical fiber 3 and the surface 51 obliquely extends to be inclined downward toward the front side.

When the block 10 includes the above-described two surfaces 51 and 52, an incident angle of the light beam L3 incident on the surface 51 and an incident angle of the light beam L4 incident on the surface 52 are different from each other. Therefore, the light beam L4 incident on the surface 52 is guided to the side in front of the light beam L3 incident on the surface 51. As described above, the light beam L4 having deviated from the original optical path enters the surface 52, and the surface 52 is provided to guide the deviated light beam L4 in a direction (a direction crossing a direction in which the condensing lenses 18a are aligned, for example, a direction toward the optical fiber 3) deflected from the condensing lens 18a so that the light beam L4 misses the condensing lens 18a. On the other hand, the surface 51 is provided so that the light beam L3 that passes through the original optical path is incident, the light beam L3 is guided to the condensing lens 18a, and the light beam L3 is condensed on the light receiving element 22.

Figure 9:
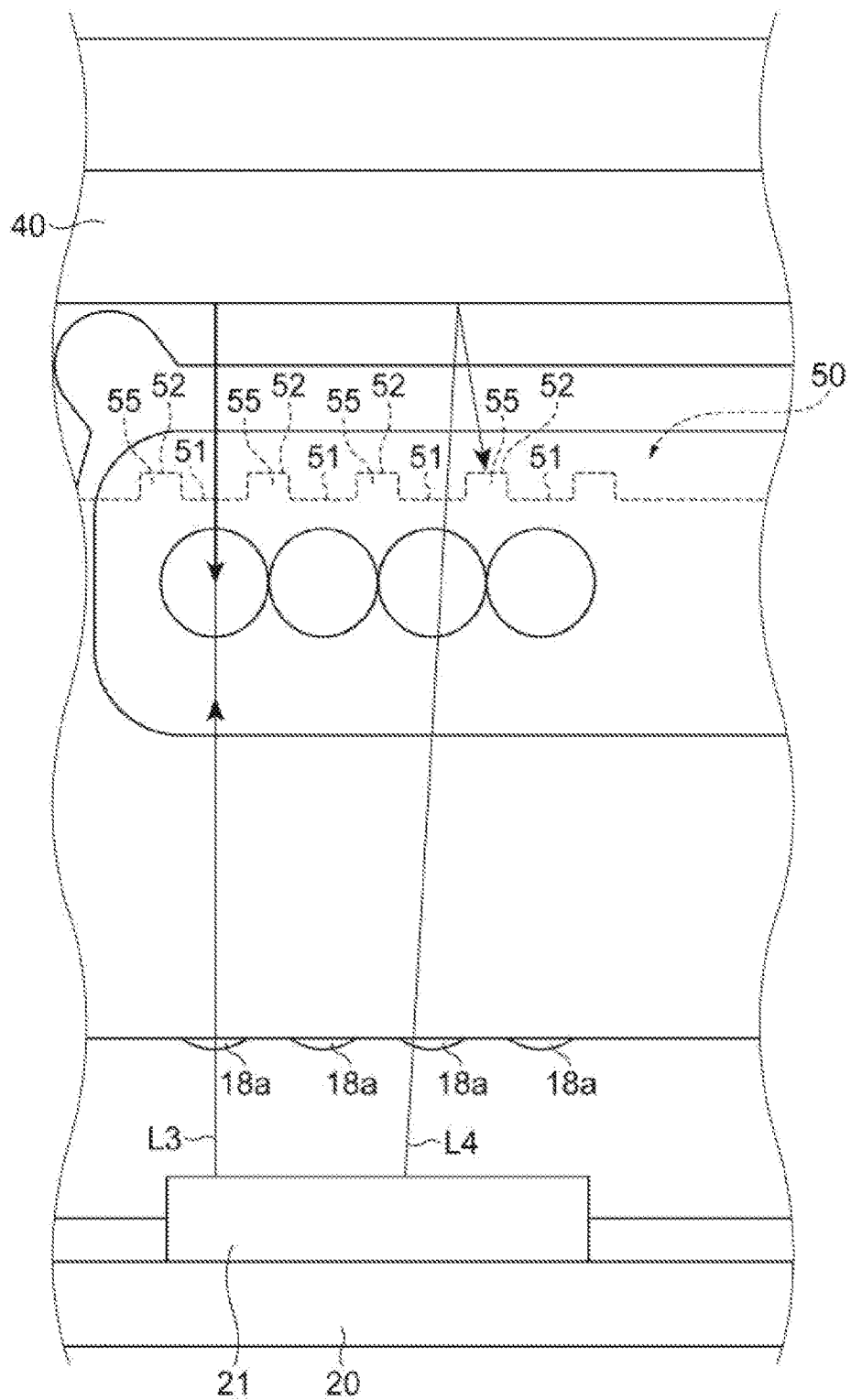
FIG. 9 is a diagram showing the refraction part and a light emitting element in FIG. 8.
Figure 10:
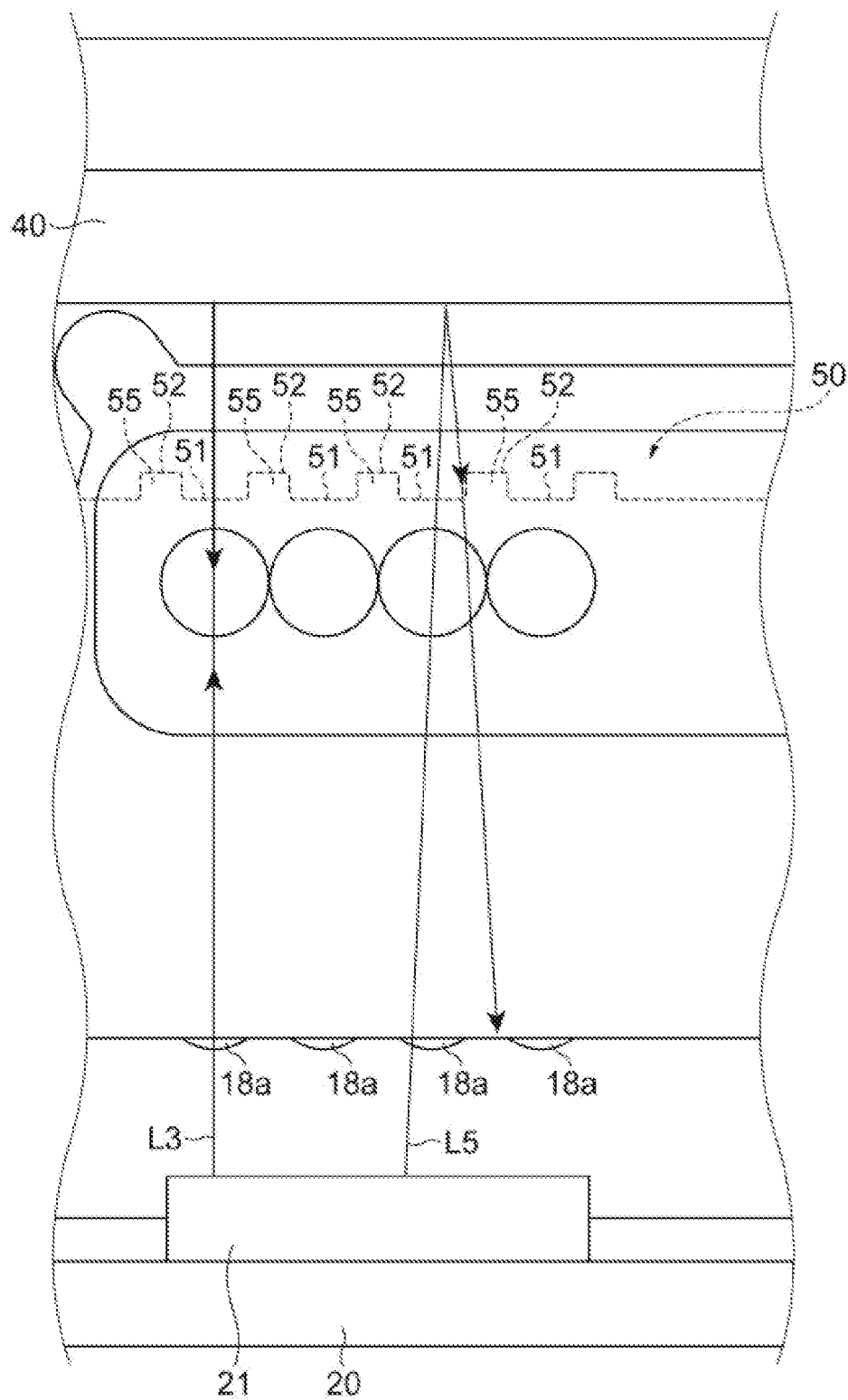
FIG. 10 is a diagram showing the refraction part and the light emitting element in FIG. 8.

FIG. 9 and FIG. 10 are diagrams of the light emitting element 21, the refraction part 50, and the condensing lens 18a seen from the side of the optical fiber 3. As shown in FIG. 9 and FIG. 10, the surface 52 of the refraction part 50 is a top surface of a protrusion 55 that protrudes from the surface 51 toward the mirror 40. The protrusions 55 protrude in, for example, rectangular shapes, and are provided in a number one more than the number of condensing lenses 18a (for example, five). In a lateral direction in which the plurality of condensing lenses 18a are aligned, the protrusion 55 and the condensing lens 18a are provided to be alternately present according to the disposition of the light emitting elements 21.

As described above, the light beam L4 that hits the surface 52 which is the top surface of the protrusion 55 is refracted and deflected from the condensing lens 18a. In addition, as shown in FIG. 10, a light beam L5 that hits a side surface of the protrusion 55 may travel in a direction of the condensing lens 18a. Here, in the present embodiment, in consideration of the above light beam L5, the diameter of the condensing lens 18a is set to a small value at which the light beam L5 (a portion of the light beam L2) that hits the protrusion 55 misses the condensing lens 18a. For example, a value of the diameter of the condensing lens 18a in consideration of the light beam L5 is smaller than a value of the diameter of the condensing lens by 10% or more and 20% or less without consideration of the light beam L5. That is, when the diameter of the condensing lens without consideration of the light beam L5 is 250 μm, the diameter of the condensing lens 18a in consideration of the light beam L5 is 200 μm or more and 225 μm or less. When the diameter of the condensing lens 18a is smaller than a beam diameter of collimated light incident thereon, since the loss increases, a minimum value of the diameter of the condensing lens 18a is set in consideration of the loss.

Advantages obtained from the optical module 1 configured as described above will be described. In a conventional optical module having a transmission speed of 10 Gbps, a positional error in alignment between the above-described light receiving element and lens array of about 30 μm is allowed in a surface in which the light receiving element is mounted. According to this allowable amount, a positional relationship between the light receiving element and the lens array can be within an allowable range during manufacture. However, in recent years, according to a high transmission speed in the optical communication field, reducing the size of components of the optical module has been in progress. In an optical module with a transmission speed of 25 Gbps or more, for example, a light reception diameter of a light receiving element decreases as a wider bandwidth of a photodiode has been required. Accordingly, a positional error in alignment between the light receiving element and a lens surface has been limited to about 10 μm in the surface in which the light receiving element is mounted.

In addition, the above-described lens array is made of a resin, and the lenses in the formed lens array have a variation of a pitch of about several μm. In addition, the light receiving element is mounted on the substrate by a die bonder or the like. However, in the die bonder, regarding accuracy of the mounted light receiving element, a variation of about 10 μm may occur in the surface (the mounting surface) on which the light receiving element is mounted. Thus, due to formation of the lens array, mounting of the light receiving element on the semiconductor substrate, and mounting of the lens array on the semiconductor substrate, a variation of larger than 10 μm may occur on the mounting surface. In this case, since a positional error in alignment between the light receiving element and the lens exceeds an allowable amount, light deviates from the light receiving element, and, for example, light may enter an adjacent light receiving element, and so-called stray light may be generated. The stray light causes extra noise in an optical signal that the adjacent light receiving element would originally have received, and deteriorates accuracy of a monitor signal generated by the adjacent light receiving element. In addition, also in the light receiving element itself, when some of light that should be received by the adjacent light receiving element is received as stray light, this becomes noise and the performance of the APC circuit deteriorates. In this manner, in light receiving elements adjacent to each other, stray light may serve as a cause of deterioration of monitor signals of both of the light receiving elements.

In the optical module 1, light emitted from the light emitting element 21 is converted into a collimated light beam L by the collimating lens 17a, and the collimated light beam L is split into two light beams in the split unit 30. One split light beam L1 is condensed on the optical fiber 3 through the condensing lenses 14a. The light beam L1 is used for signal transmission. In addition, the other light beam L2 split off by the split unit 30 reaches the mirror 40 and is reflected, and incident on the light receiving element 22 through the refraction part 50 and the condensing lens 18a. The light beam L2 is used for automatic control of an intensity of light emitted from the light emitting element 21 as monitoring light.

The refraction part 50 includes the surface 51 at which the light beam L3 reflected by the mirror 40 is guided to the condensing lens 18a and the surface 52 at which the light beam L4 reflected by the mirror 40 is deflected from the condensing lens 18a. Therefore, the light beam L3 incident on the surface 51 is guided to the condensing lens 18a by the refraction part 50. Therefore, the light beam L3 incident on the surface 51 can be reliably condensed and incident on the corresponding light receiving element 22 through the condensing lens 18a.

On the other hand, the light beam L4 incident on the surface 52 is deflected from the condensing lens 18a by the refraction part 50. Therefore, the light beam L3 incident on the surface 51 can be reliably received by the corresponding light receiving element 22, and also the light beam L4 incident on the surface 52 can be reliably deflected from the light receiving element 22. Thus, since it is possible to avoid a situation in which the light beam L4 enters the adjacent light receiving element 22, it is possible to reduce stray light.

In addition, the refraction part 50 includes the protrusion 55 on which the surface 52 is formed, and the diameter of the condensing lens 18a is set to a small value at which the light beam L5 that hits the protrusion 55 misses the condensing lens 18a. Therefore, it is possible to prevent the light beam L5 that hits the protrusion 55 having deviated from the original optical path from entering the condensing lens 18a. Therefore, since it is possible to prevent the light beam L5 from entering the adjacent light receiving element 22 more reliably, it is possible to reduce stray light more reliably.

In addition, the split unit 30 includes the surface 31 at which the incident angle θ1 of the light beam L1 which is collimated light is equal to or greater than the critical angle, the light beam L1 is totally reflected, and the light beam L1 is guided to the condensing lenses 14a, and the surface 32 at which the incident angle θ3 of the light beam L2 which is collimated light is less than the critical angle, the light beam L2 is refracted, and the light beam L2 is guided to the mirror 40. Therefore, when the split unit 30 includes the surface 31 and the surface 32, it is not necessary to provide a reflection filter and a half mirror, and the collimated light beam L can be reliably split by the resin block 10. In addition, in light emitted from the light emitting element 21, an intensity of light (optical signal) that is transmitted to the outside of the optical module and used for communication and an intensity of light (monitoring light) used for automatic control of an intensity of light emitted from the light emitting element 21 as monitoring light can be set according to widths and intervals of the surface 31 and the surface 32. For example, when the width of the surface 31 is larger than the width of the surface 32, the intensity of monitoring light can be set to be lower than the intensity of the optical signal. The intensity of monitoring light is generally set to 10% or less of the intensity of signal light.

While the embodiments according to the present invention have been described above, the present invention is not limited to the above-described embodiments. That is, it can be easily understood by those skilled in the art that the present invention can be variously changed and modified within the spirit and scope of the appended claims. For example, while an example in which a refractive index of the block 10 is 1.64 and the critical angle is 37.57° has been described in the above-described embodiment, values of the refractive index and the critical angle can be appropriately changed according to a material of the block, and the like.

What is claimed is:

1. An optical module comprising:
   a substrate having a first side;
   a light emitting element mounted on the first side of the substrate, the light emitting element being configured to emit a radiated light;
   a light receiving element mounted on the first side of the substrate; and
   a block mounted on the first side of the substrate, the block including:
      a collimating lens configured to convert the radiated light into a collimated light;
      an optical splitter configured to split the collimated light into a reflected light and a transmitted light;
      a first condensing lens configured to condense the reflected light on an optical waveguide member;
      a second condensing lens facing the light receiving element;
      a mirror configured to reflect the transmitted light; and a refraction part having a first refracting surface and a second refracting surface, the first refracting surface being configured to refract the transmitted light reflected by the mirror for guiding the transmitted light reflected by the mirror to the second condensing lens, the second refracting surface being configured to deflect the transmitted light reflected by the mirror from the second condensing lens;

wherein the second condensing lens is configured to condense the transmitted light refracted by the refraction part on the light receiving element.

2. The optical module according to claim 1,
wherein the refraction part further includes a protrusion having the second refracting surface, and
wherein the second condensing lens has a diameter set to a small value at which a portion of the transmitted light reflected by the mirror that hits the protrusion misses the second condensing lens.

3. The optical module according to claim 1,
wherein the light receiving element is positioned between a position of the first condensing lens and a position of the light emitting element.

4. The optical module according to claim 3,
wherein the block includes a concave housing unit on a surface in contact with the first side of the substrate, and
wherein the collimating lens and the second condensing lens are provided inside the concave housing unit.

5. The optical module according to claim 4, further comprising
a control circuit mounted on the substrate, the control circuit being configured to adjust an intensity of the radiated light emitted from the light emitting element according to an intensity of the transmitted light received by the light receiving element.

6. The optical module according to claim 5, further comprising
a first lens array in which a plurality of collimating lenses including the collimating lens are disposed in a line along a first straight line; and
a second lens array in which a plurality of second condensing lenses including the second condensing lens are disposed in a line along a second straight line parallel to the first straight line.

7. The optical module according to claim 6,
wherein the block is made of a resin.

8. The optical module according to claim 1,
wherein the optical splitter has a reflecting surface and a transmitting surface,
wherein the reflecting surface has an first incident angle equal to or greater than a critical angle for splitting off the reflected light from the collimated light; and
wherein the transmitting surface has an second incident angle smaller than the critical angle for splitting off the transmitted light from the collimated light.

9. The optical module according to claim 8,
wherein a ratio of the intensity of the reflected light with respect to the intensity of the transmitted light is set according to a ratio of a width of the reflecting surface of the optical splitter with respect to a width of the transmitting surface of the optical splitter.

10. The optical module according to claim 9,
wherein a width of the reflecting surface of the optical splitter is set to be larger than a width of the transmitting surface of the optical splitter.

* * * * *